US011962912B2

(12) United States Patent
Murphy et al.

(10) Patent No.: US 11,962,912 B2
(45) Date of Patent: Apr. 16, 2024

(54) OBJECT DETECTION VIA COMPARISON OF SYNCHRONIZED PULSED ILLUMINATION AND CAMERA IMAGING

(71) Applicant: Aptiv Technologies Limited, St. Michael (BB)

(72) Inventors: Morgan D. Murphy, Kokomo, IN (US); Ronald M. Taylor, Greentown, IN (US)

(73) Assignee: Aptiv Technologies AG, Schaffhausen (CH)

( * ) Notice: Subject to any disclaimer, the term of this patent is extended or adjusted under 35 U.S.C. 154(b) by 103 days.

(21) Appl. No.: 17/349,642

(22) Filed: Jun. 16, 2021

(65) Prior Publication Data

US 2022/0408005 A1    Dec. 22, 2022

(51) Int. Cl.
| | |
|---|---|
| *H04N 23/72* | (2023.01) |
| *B60Q 1/00* | (2006.01) |
| *B60R 11/04* | (2006.01) |
| *G01S 17/86* | (2020.01) |
| *G01S 17/894* | (2020.01) |
| *G05D 1/00* | (2006.01) |
| *G05D 1/02* | (2020.01) |
| *G06V 20/58* | (2022.01) |

(52) U.S. Cl.
CPC ........... *H04N 23/72* (2023.01); *B60Q 1/0023* (2013.01); *B60R 11/04* (2013.01); *G01S 17/86* (2020.01); *G01S 17/894* (2020.01); *G05D 1/0251* (2013.01); *G06V 20/58* (2022.01); *G05D 2201/0213* (2013.01)

(58) Field of Classification Search
CPC ..... H04N 5/2352; G01S 17/86; G01S 17/894; G06V 20/58; B60Q 1/0023; B60R 11/04; G05D 1/0251; G05D 2201/0213
USPC ........................................................ 348/119
See application file for complete search history.

(56) References Cited

U.S. PATENT DOCUMENTS

| | | | |
|---|---|---|---|
| 11,079,464 B2* | 8/2021 | Finlay ................... H04B 1/385 |
| 2002/0071122 A1* | 6/2002 | Kulp ..................... G01N 21/53 |
| | | | 356/437 |
| 2006/0171566 A1* | 8/2006 | Gindele .................. G06T 7/586 |
| | | | 356/3 |
| 2009/0052878 A1* | 2/2009 | Warpakowski Furlan .................. |
| | | | H04N 23/74 |
| | | | 348/E5.022 |
| 2012/0187191 A1* | 7/2012 | Olmstead ........... G06K 7/10861 |
| | | | 235/462.13 |

(Continued)

*Primary Examiner* — Christopher S Kelley
*Assistant Examiner* — Asmamaw G Tarko
(74) *Attorney, Agent, or Firm* — Miller Johnson

(57) ABSTRACT

An image processing system may comprise a global shutter camera, an illumination emitter, and a processing system comprising at least one processor and memory. The processing system may be configured to control the image processing system to: control the illumination emitter to illuminate a scene; control the global shutter camera to capture a sequence of images of the scene, wherein the captured sequence of images includes images that are captured without illumination of the scene by the illumination emitter and images that are captured while the scene is illuminated by the illumination emitter; and determine presence of an object in the scene based on comparison of the images captured without illumination of the scene and images captured with illumination of the scene.

24 Claims, 10 Drawing Sheets
(2 of 10 Drawing Sheet(s) Filed in Color)

(56) References Cited

U.S. PATENT DOCUMENTS

| | | | |
|---|---|---|---|
| 2013/0088726 A1* | 4/2013 | Goyal | G01S 17/10 356/634 |
| 2017/0272651 A1* | 9/2017 | Mathy | G01S 17/894 |
| 2020/0128161 A1* | 4/2020 | Kroekel | H04N 25/531 |
| 2021/0208260 A1* | 7/2021 | Song | G01S 7/497 |
| 2021/0329157 A1* | 10/2021 | Lu | H04N 23/11 |

* cited by examiner

Laser Power  75 W
Duty Cycle  0.1%
Pulse Duration  100 nsec
Full Cycle  0.1 msec

OBJECT DETECTION VIA COMPARISON OF SYNCHRONIZED PULSED ILLUMINATION AND CAMERA IMAGING

FIELD OF THE INVENTION

This invention relates to detecting objects in a scene based on comparison of images captured by a camera with a synchronized pulsed illumination that may be used in autonomous vehicle applications. Thus, this invention relates generally to detecting objects and, more particularly, to systems and methods for detecting objects in a scene for autonomous vehicle applications.

BACKGROUND

Lidar sensors are being considered for autonomous vehicle application with the potential for object detection and discrimination. These features of light detection and ranging (LiDAR) sensors have allowed for the consideration of autonomous or semi-autonomous vehicle control. For example, cruise control systems may incorporate LiDAR for detecting an object or another vehicle in the pathway of a vehicle. Depending on the approach speed, the cruise control setting may be automatically adjusted to reduce the speed of the vehicle based on detecting another vehicle in the pathway of the vehicle. In addition Lidar sensors allow the detection of small objects at long range (e.g. a brick or block on the roadway at 150 meters distance from the host vehicle) that would pose a threat if it were struck. Other Advanced Driver Assistance Systems (ADAS) sensors (active sensors like radar or passive sensors like cameras) do not have the sensitivity or resolution for this kind of object discrimination particularly at long ranges needed for the opportunity and capability to avoid a collision.

Unfortunately, even after years of development by many companies using different techniques, LiDAR sensors are nowhere near as mature in technology development as other ADAS sensing technologies (e.g. radars and cameras) and consequently are on a relative basis, very expensive. Furthermore, uncertainty in the product volumes based upon timeline assumptions for fully autonomous vehicle application add to the cost risk.

SUMMARY

Exemplary embodiments of this disclosure provide systems and methods that can be used to improve operation of object detection system. More specifically, exemplary embodiments of this disclosure provide an image processing system that includes a global shutter camera and an illumination emitter controlled to provide images in which presence and/or characteristics of objects can be determined.

According to one exemplary embodiment, an image processing system includes: a camera; an illumination emitter; and a processing system comprising at least one processor and memory. The processing system is configured to control the image processing system to: control the illumination emitter to illuminate a scene; control the camera to capture a sequence of images of the scene, wherein the captured sequence of images includes a first image that is captured without illumination of the scene and a second image that are captured while the scene is illuminated; and determine presence of an object in the scene based on comparison of illumination of objects first and second images.

In another exemplary embodiment, an image processing system includes: a global shutter camera; an illumination emitter; and a processing system comprising at least one processor and memory. The processing system is configured to control the image processing system to: control the illumination emitter to illuminate a scene; control the global shutter camera to capture a sequence of images of the scene, wherein the captured sequence of images includes images that are captured without illumination of the scene by the illumination emitter and images that are captured while the scene is illuminated by the illumination emitter; and determine presence of an object in the scene based on comparison of the images captured without illumination of the scene and images captured with illumination of the scene.

In another exemplary embodiment, the processing system is further configured to, in response to determining presence of the object in the scene, determine one or more characteristics of the object in the scene based on comparison of the images captured without illumination of the scene and the images captured with illumination of the scene.

In another exemplary embodiment, comparing of the images captured without illumination of the scene and the images captured with illumination of the scene includes comparing an image captured without illumination to a subsequent image captured with illumination.

In another exemplary embodiment, comparing the image captured without illumination to the subsequent image captured with illumination includes comparing pixels at the same positions in the image captured without illumination and the subsequent image captured with illumination.

In another exemplary embodiment, the processing system is further configured to: in response to determining presence of the object in the scene, determine a difference between intensity of pixels corresponding to the object in the image captured with illumination and intensity of pixels corresponding to the object in the image captured without illumination; and determine the object as a potential threat for a vehicle based on the difference being greater than a set value.

In another exemplary embodiment, the processing system is further configured to: based on determining that the object is a potential threat for the vehicle, determine whether the object is in a path of the vehicle; and based on determining that the object is in the path of the vehicle, control the vehicle to take defensive measured to avoid collision with the object.

In another exemplary embodiment, the processing system is further configured to control a vehicle to be positioned within a traveling lane based on analyzing images of the scene captured without illumination.

In another exemplary embodiment, a field of view of the global shutter camera exceeds a beam pattern of the illumination emitter.

In another exemplary embodiment, the illumination emitter is a pulsed laser illumination source.

In another exemplary embodiment, the pulsed laser illumination source comprises a focused diode laser array including a flat and a spherical surface, a collimation lens comprising two spherical surfaces, two horizontal divergence lenses comprising two spherical and two cylindrical surfaces, and two vertical divergence lenses comprising two spherical and two cylindrical surfaces.

In another exemplary embodiment, the image processing system further comprises a light detection and ranging (LiDAR) system configured to detect objects within a path of a vehicle.

In another exemplary embodiment, the illumination emitter is controlled to provide illumination for a duration of an integration time of the global shutter camera when capturing images while the scene is illuminated by the illumination emitter.

In another exemplary embodiment, a ratio of a number of images captured with illumination of the scene to a number of images captured without illumination of the scene is less than one half.

In another exemplary embodiment, a computer implemented method comprises: controlling an illumination emitter to illuminate a scene; controlling a global shutter camera to capture a sequence of images of the scene, wherein the captured sequence of images includes images that are captured without illumination of the scene by the illumination emitter and images that are captured while the scene is illuminated by the illumination emitter; and determining presence of an object in the scene based on comparison of the images captured without illumination of the scene and images captured with illumination of the scene.

In another exemplary embodiment, the method further comprises, in response to determining presence of the object in the scene, determining one or more characteristics of the object in the scene based on comparison of the images captured without illumination of the scene and the images captured with illumination of the scene.

In another exemplary embodiment, comparing of the images captured without illumination of the scene and the images captured with illumination of the scene includes comparing an image captured without illumination to a subsequent image captured with illumination.

In another exemplary embodiment, comparing the image captured without illumination to the subsequent image captured with illumination includes comparing pixels at the same positions in the image captured without illumination and the subsequent image captured with illumination.

In another exemplary embodiment, the method further comprises: in response to determining presence of the object in the scene, determining a difference between intensity of pixels corresponding to the object in the image captured with illumination and intensity of pixels corresponding to the object in the image captured without illumination; and determining the object as a potential threat for a vehicle based on the difference being greater than a set value.

In another exemplary embodiment, the method further comprises: based on determining that the object is a potential threat for a vehicle, determining whether the object is in a path of the vehicle; and based on determining that the object is in the path of the vehicle, controlling the vehicle to take defensive measured to avoid collision with the object.

In another exemplary embodiment, the method further comprises controlling a vehicle to be positioned within a traveling lane based on analyzing images of the scene captured without illumination.

In another exemplary embodiment, a computer-readable non-transitory storage medium having stored therein a program to be executed by a computer of an image processing system, the program, when executed, causing the computer to control the image processing system to at least: control an illumination emitter to illuminate a scene; control a global shutter camera to capture a sequence of images of the scene, wherein the captured sequence of images includes images that are captured without illumination of the scene by the illumination emitter and images that are captured while the scene is illuminated by the illumination emitter; and determine presence of an object in the scene based on comparison of the images captured without illumination of the scene and images captured with illumination of the scene.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

The patent or application file contains at least one drawing executed in color. Copies of this patent or patent application publication with color drawing(s) will be provided by the Office upon request and payment of the necessary fee.

DETAILED DESCRIPTION

Certain example embodiments of this application provide solution(s) that improve detection of objects without increasing complexity of the system. Embodiments of this disclosure may reduce number of imaging system components needed to detect objects of autonomous vehicle applications.

The problem(s) of single sensor technology does not provide the intra vehicle coverage that is (are) solved by adding several sensors and apply situational awareness to meet the customer requirements.

Examples of the present technology optimize the performance of automotive ADAS systems. Some examples of the present technology optimize the performance of automotive ADAS systems by providing a lower cost approach while providing for long range object detection at high resolution using existing proven technologies that are cost effective based upon existing development maturity and market deployment.

Examples of the present technology include a pulsed laser illumination source that is directed at the scene. A camera (e.g., a global shutter camera) is synchronized to the laser pulses such that a comparison of object in the scene can be imaged with both active illumination (i.e. laser pulse) and with no illumination (i.e. camera in passive mode with no laser illumination). The comparison of the same imaged pixels at slightly different time intervals yields very high resolution (e.g. 4 MP camera yields a resolution over the based field of view of less than 2 minutes of arc or 0.03° per camera imaged pixel). At this resolution, small objects at large distances can be discriminated objects of interests in the images. For example, an 8-inch brick at 150 meters can be discriminated as an object with 6 pixel array resolution (e.g. 3×2 array).

The capability of detecting the objects is based on a comparison of the illuminated light reflecting off of the object to the background light. Since the background light reflection serves as a continuous reference point, any object that has a higher reflection based upon the pulsed light reflection would constitute an object of interest in the vehicle path. The comparison of the active to passive reflections and the higher the ratio of illuminated reflection to background reflection, the more likely that the object has a vertical height component that can constitute a potential threat. Consequently, once an object is detected from the background noise, standard image enhancement algorithms can be used to determine if the object is in the vehicle path, the estimated size and time to collision so as to take defensive measures to avoid a collision.

Figure 1:
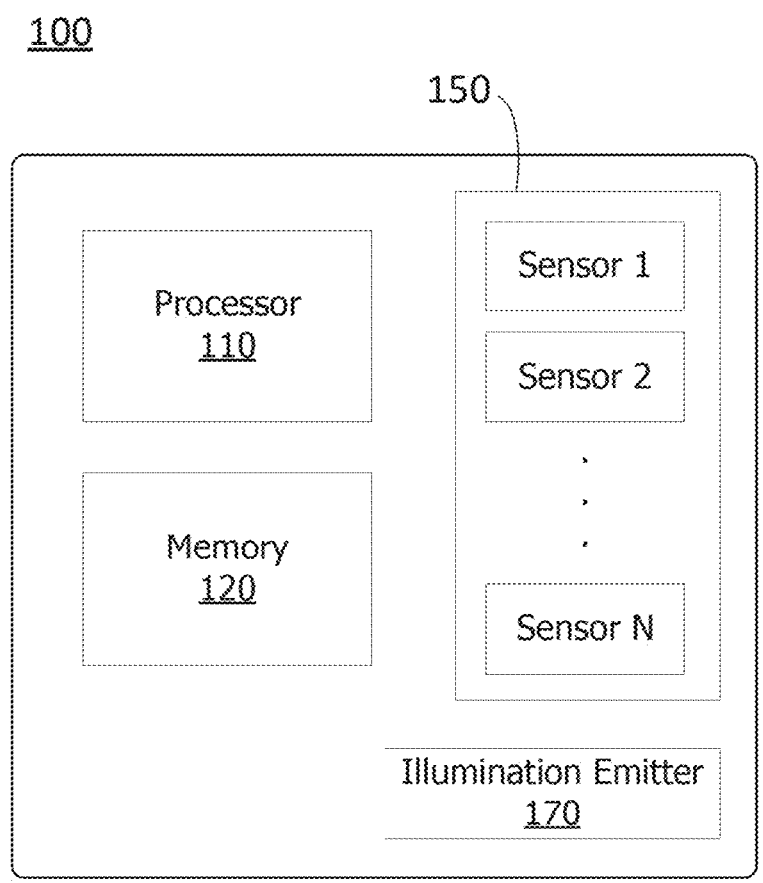
FIG. 1 illustrates an exemplary image processing system according to an embodiment of the present disclosure.

FIG. 1 illustrates an exemplary system 100 according to an embodiment of the present disclosure. The system 100 may perform one or more operations related to automotive ADAS systems, such as detecting objects in a vehicle path. The system 100 may be included in a vehicle capable of performing semi-autonomous and autonomous movement on land, water and/or in the air.

The system 100 may include a processor 110, memory 120 and one or more sensors 150. While not illustrated in FIG. 1, the system 100 may include other components such as input device(s), display(s), communication circuitry, etc. The one or more sensors 150 may include Radio Detection and Ranging (Radar) systems, Light Detection and Ranging (LiDAR) systems and cameras. The system 100 may be configured to receive and analyze data from the plurality of sensors 150 in order to safely control operation of the vehicle. While not illustrated in FIG. 1, the system 100 may also receive information from external systems (e.g., other vehicles, remove servers, and/or remote sensors) to be analyzed together with the data from the plurality of sensors 150.

The processor 110 comprises hardware (e.g., circuitry) and/or software configured to perform operations discussed in this application. While a single processor 110 is illustrates the processor 110 may include a plurality of processors and/or one or more hardware circuits configured to perform one or more operations discussed in this application. The processor 110 may be coupled to memory configured to store a computer program comprising instructions for execution by the processor.

The system 100 may include an illumination emitter 170. The illumination emitter 170 may be a pulsed laser illumination source. The illumination emitter 170 may include a plurality of lens elements configured to output a beam of desired characteristics. For example, the illumination emitter 170 may include a focused diode laser array including a flat and a spherical surface, a collimation lens comprising two spherical surfaces, two horizontal divergence lenses comprising two spherical and two cylindrical surfaces, and two vertical divergence lenses comprising two spherical and two cylindrical surfaces.

In some examples, the illumination emitter 170 may be part of one of the sensors (e.g., a laser part of a light detection and ranging system). In such examples, one or more of the sensors 150 not including the illumination emitter (e.g., a camera) may be synchronized with the operation of the illumination emitter included in another sensor.

Figure 2A:
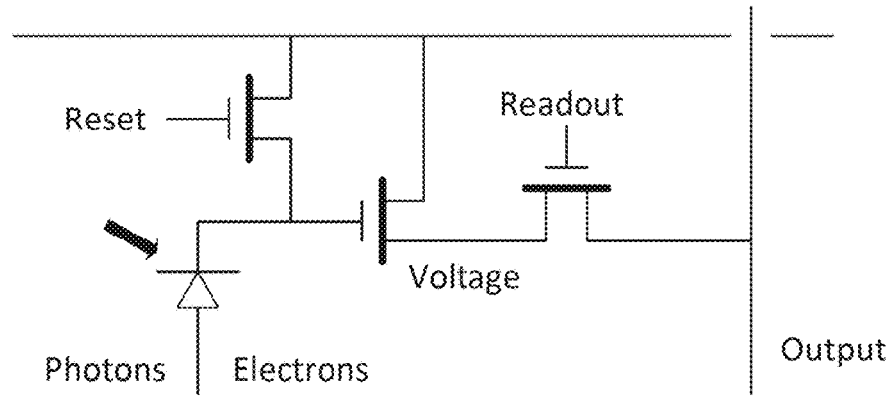
FIG. 2A illustrates a simplified circuit diagram of a rolling shutter imager
Figure 2B:
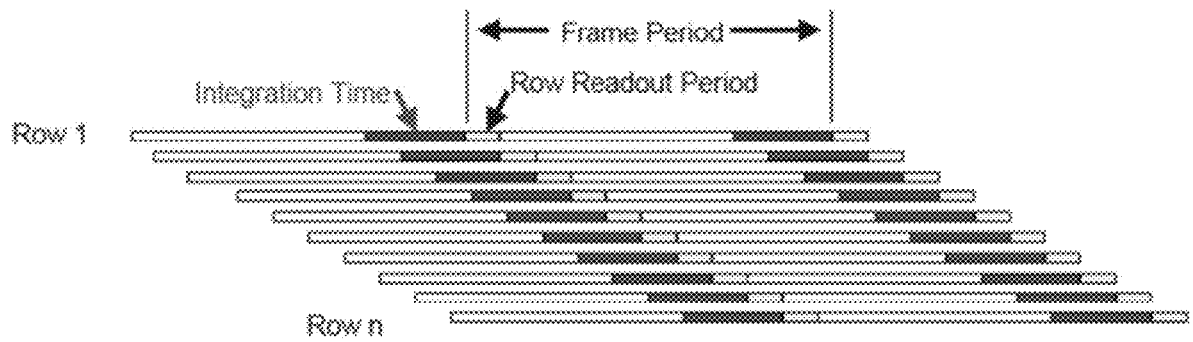
FIG. 2B illustrates an image sampling of the rolling shutter imager.
Figure 3A:
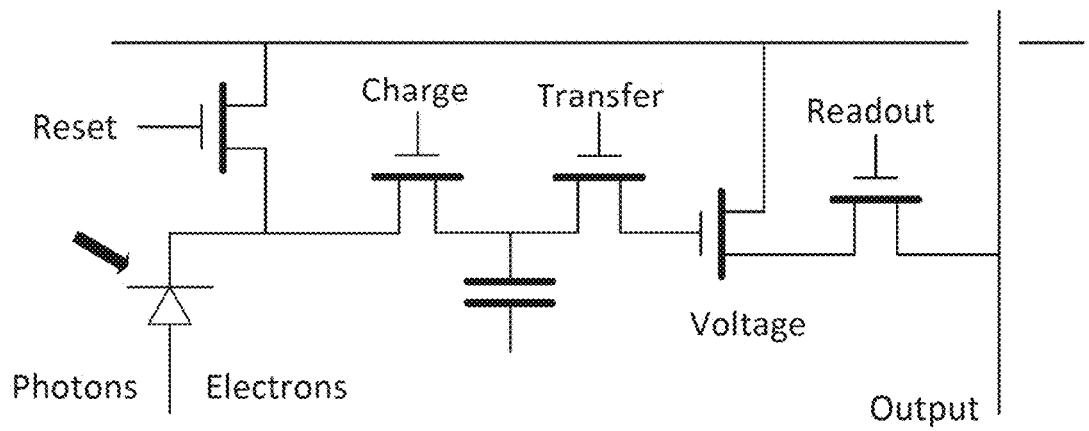
FIG. 3A illustrates a simplified circuit diagram of a global shutter imager.
Figure 3B:
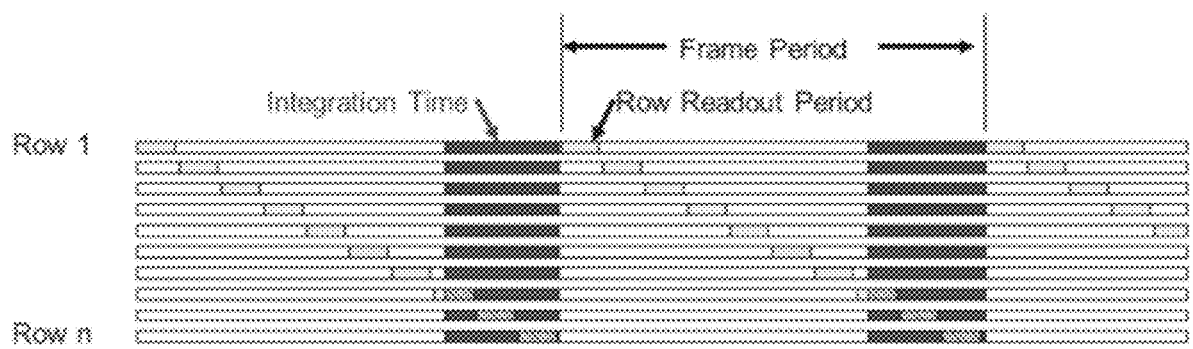
FIG. 3B illustrates an image sampling of the global shutter imager.

The one or more sensors 150 may include cameras including imagers configured to capture images. Cameras used in automotive application include imagers that are of two main types: rolling shutter and global shutter. The difference in the image sampling is shown by way of illustration in FIGS. 2A to 3B. FIG. 2A illustrates a simplified circuit diagram of a rolling shutter imager and FIG. 2B illustrates an image sampling of the rolling shutter imager. FIG. 3A illustrates a simplified circuit diagram of a global shutter imager and FIG. 3B illustrates an image sampling of the global shutter imager.

In a rolling shutter imager, each column of pixels can have a circuit for converting photons into a voltage that is read out at the output (see e.g., FIG. 2A). Each row of pixels on the imager begins the next rows readout after completing the readout of a previous row. With a rolling shutter imager, each row of pixels integrates with the same time length but with a shifted starting time. Thus, each row will start and end its exposure slightly offset in time from its neighbor. An image captured using the rolling shutter imager, can have pixels that are captured at different points in time. As shown in FIG. 2B the integration time for the adjacent rows can overlap but is also offset from each other and the row readout period is offset from adjacent rows without overlap.

Figure 4:
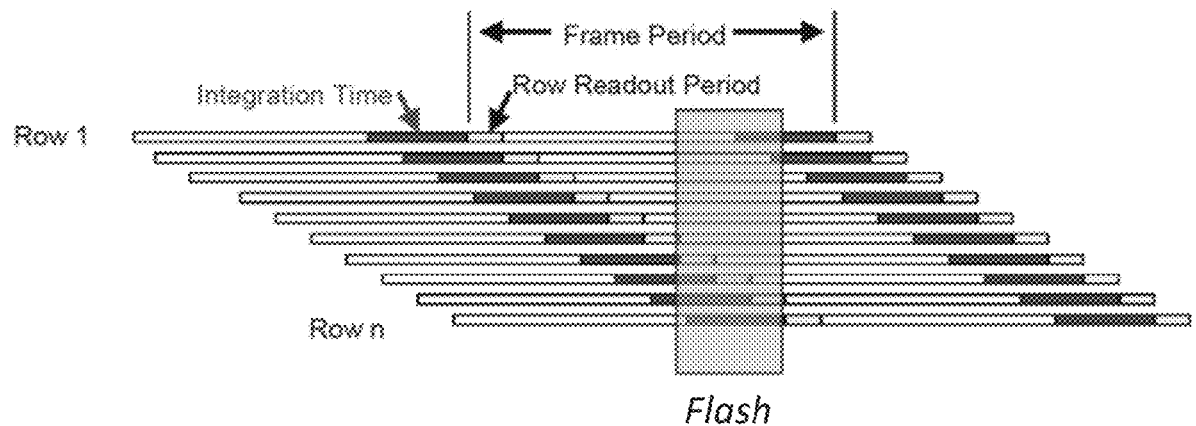
FIG. 4 illustrates providing illumination during operation of a rolling shutter imager.

If an active light source (e.g. laser pulse) is provided, the flash will overlap with a small portion of the total integration time. FIG. 4, for example, shows that a flash provided during a portion of the frame period will overlap only certain rows of the imager and/or during only certain periods of the integration time. Some pixels of the imager will not see the light from the flash (see e.g., FIG. 4). It may not be possible to provide a flash during a period of time from a start of the integration in row 1 to the end of the integration in row n. In addition, the flash may overlap integration of rows that below to different frames. For example, as shown in FIG. 4, providing a flash during integration of row n for a first frame, will also provide the flash during integration of rows 1 and 2 for a second frame.

Figure 5:
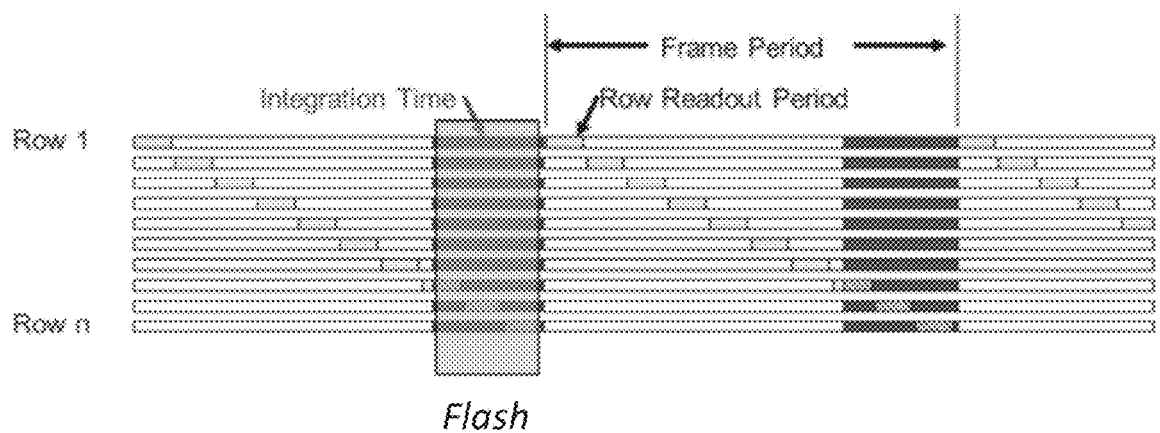
FIG. 5 illustrates providing illumination during operation of a global shutter imager.

With a global shutter imager, all pixels are exposed (or pixel charge is integrated) at the same time. All of the pixels have a simultaneous exposure start and stop times, which provides a real snapshot of a scene (see e.g., FIG. 3B). In global shutter imagers, additional circuitry (see e.g., FIG. 3A) is needed for each pixel to be able to start and stop exposure simultaneously. Since the charge collection (or integration) function is decoupled from the pixel charge readout function, the integration time and the active light source pulse (e.g., a laser pulse) can overlap completely in a global shutter imager (see e.g., FIG. 5). As shown in FIG. 5, the duration of the flash may correspond to the duration of the integration time. In other examples, the duration of the flash may correspond to only a portion of the integration time, while still providing the flash to each of the rows.

In certain example embodiments, the light source is synchronized to the global shutter camera operation so that the laser emits in a cycle that permits consistent field positions to be compared with laser emissions and without. Examples of the present technology include synchronizing the light source to the global shutter camera operation so that the light source is emitted during integration time of each row in the global shutter camera. In some examples, a time duration during which the light source emits light is approximately the same as the integration time. In some examples, the time duration of the light source being emitted may be set to a predetermined value that is above or below the integration time of the camera. In some examples, the time duration of the light source being emitted may be dynamically adjusted to correspond to the parameters of the camera (e.g., integration time) and/or characteristics of the image captured without the light source. For example, the duration of the light source being emitted may be adjusted based on brightness of the image.

Figure 6:
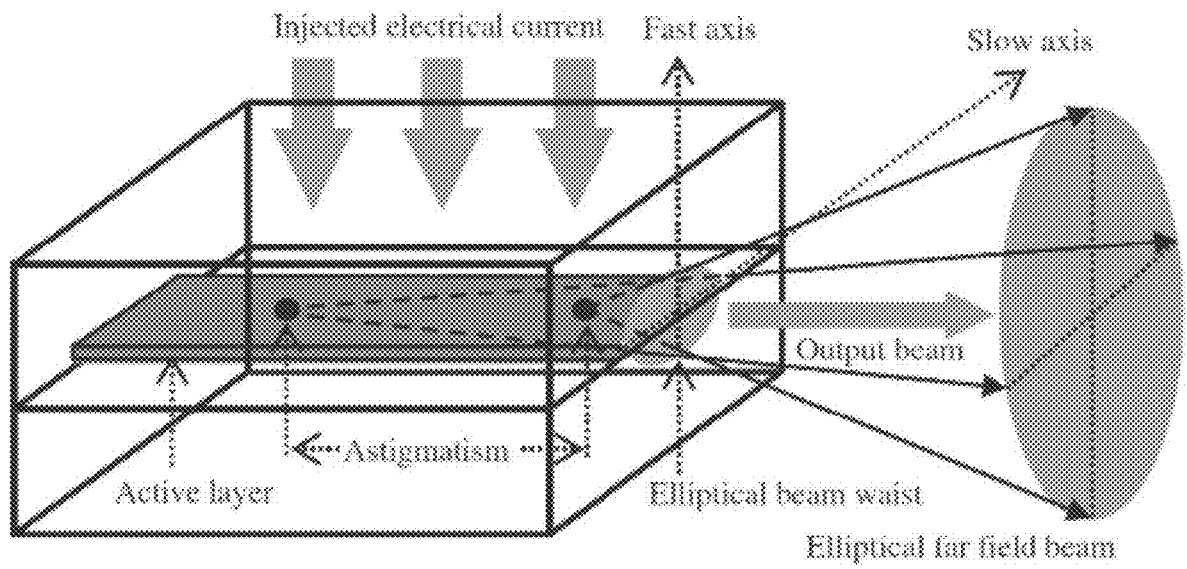
FIG. 6 illustrates characteristics of a laser emitter according to an embodiment of the present disclosure.

In certain examples, the light source may be a laser emitter. The characteristics of a laser emitter are shown in FIG. 6 according to one example of the present disclosure. The emitter optics may provide a predetermined beam pattern (e.g., an elliptical far field beam) having a predetermined horizontal and vertical angles. The emitter optics may be designed to create a full width beam pattern (in this case 60° horizontal×10° vertical) using the pulsed laser light frames to compare object active to passive reflectance at specific pixels within the larger camera field of view.

Figure 7A:
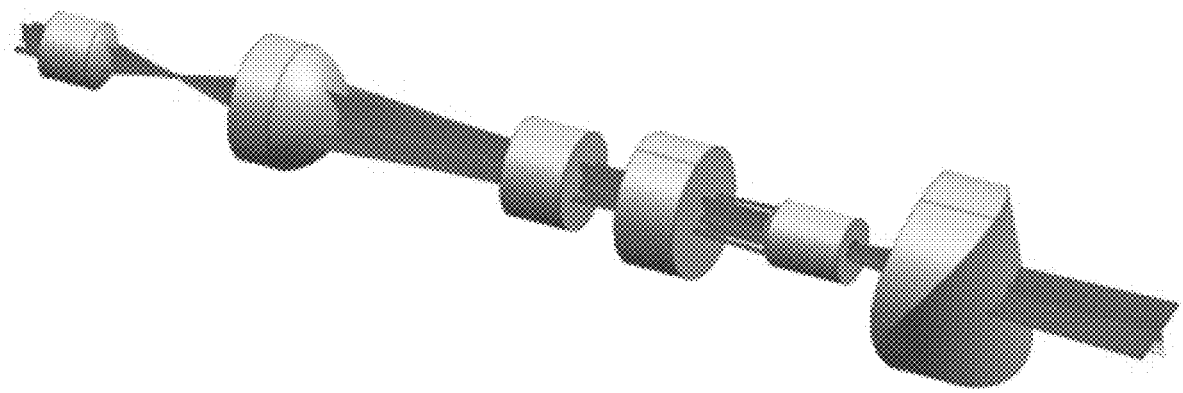
FIG. 7A illustrates a perspective view of the lens elements of a laser transmit lens construction according to an embodiment of the present disclosure.
Figure 7B:
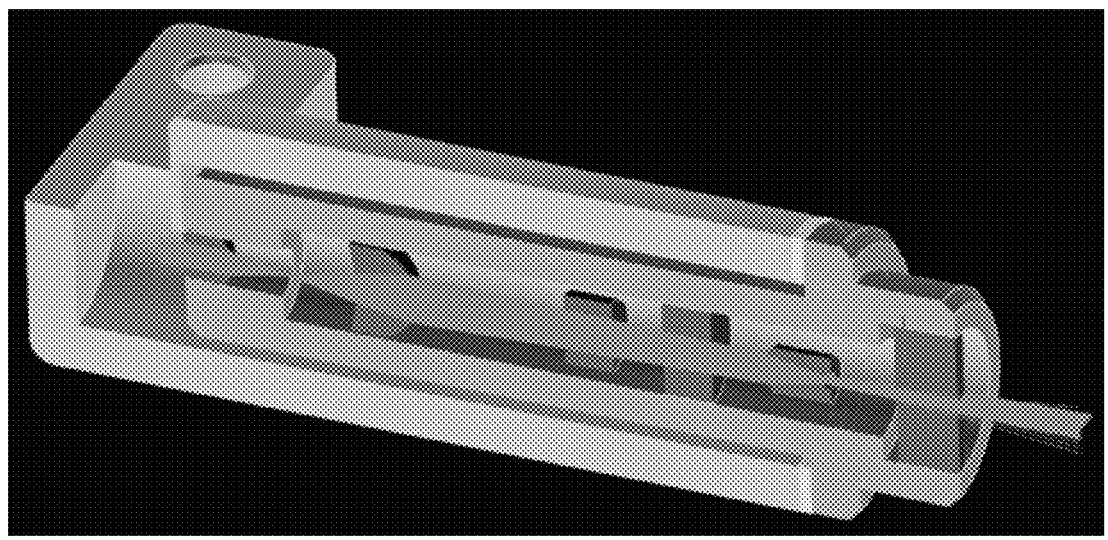
FIG. 7B illustrates a cross sectional view of a laser transmit lens construction according to an embodiment of the present disclosure.

FIGS. 7A and 7B illustrates a laser transmit lens construction according to one embodiment of the present disclosure. FIG. 7A illustrates a perspective view of the lens elements and FIG. 7B illustrates a cross sectional view of the laser transmit lens construction. The laser transmit lens construction includes a six lens design providing f/1.75. The laser transmit lens construction may include one Focused Diode Laser Array comprising 1 flat and 1 spherical surface, one Collimation including two spherical surfaces, two Horizontal Divergence elements (e.g., 3.9× reducer Galilean telescope) comprising two spherical and two cylindrical surfaces, and two vertical divergence elements (e.g., 1.6× reducer Galilean telescope) comprising two spherical and two cylindrical surfaces. While not illustrated in FIGS. 7A and 7B one or more additional lens elements may be included in the laser transmit lens construction to obtain the desired beam pattern. The use of non-aspheric lens elements in the laser transmit lens (e.g. cylindrical and spherical surfaces) creates the opportunity for a lower lens element construction cost.

Figure 8:
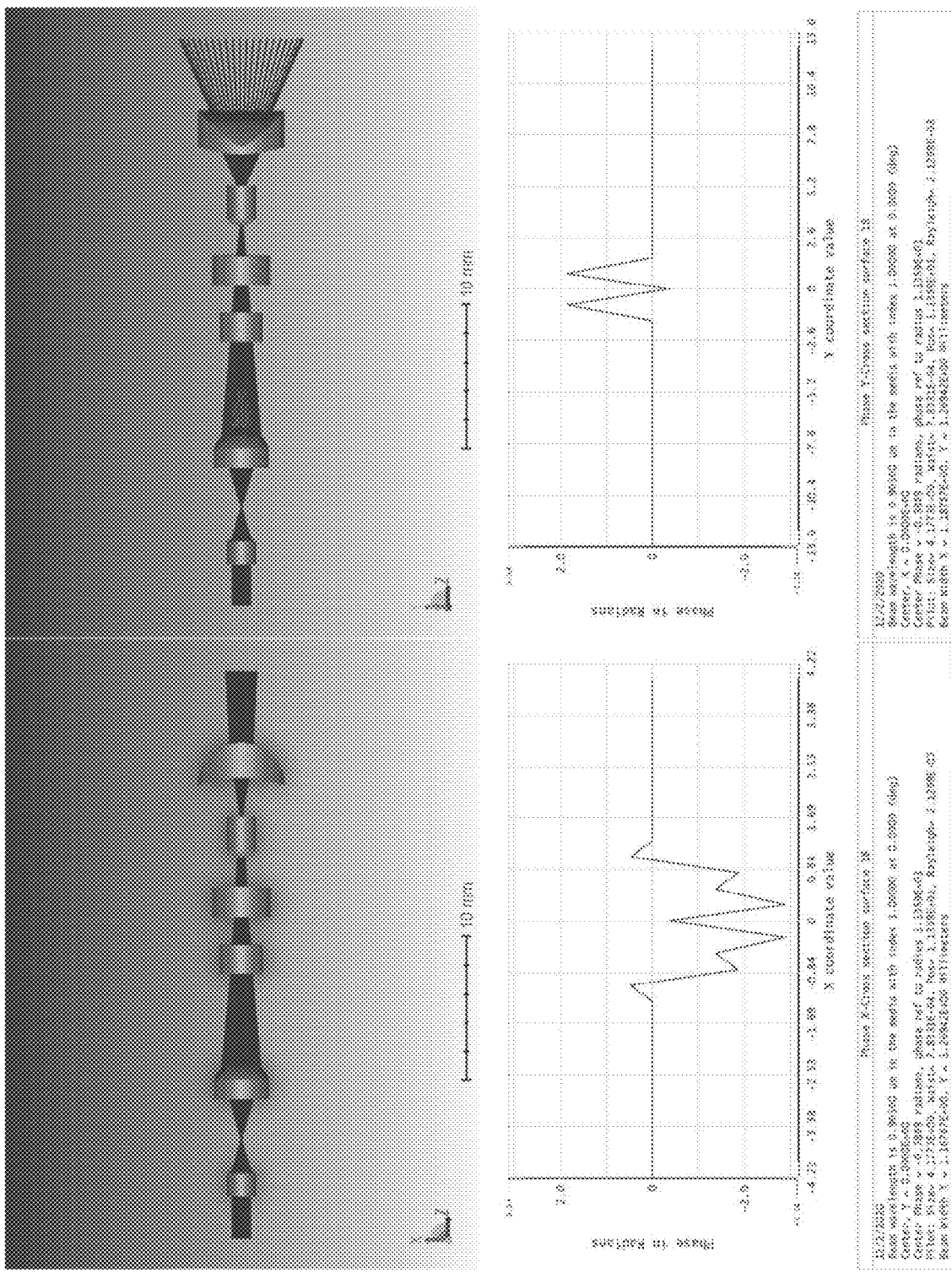
FIG. 8 illustrates the laser emitter optic characteristics including the cross section phase in radians along the x and y orientation of a Gaussian beam with a wavelength of 0.905 $\mu m$.
Figure 9:
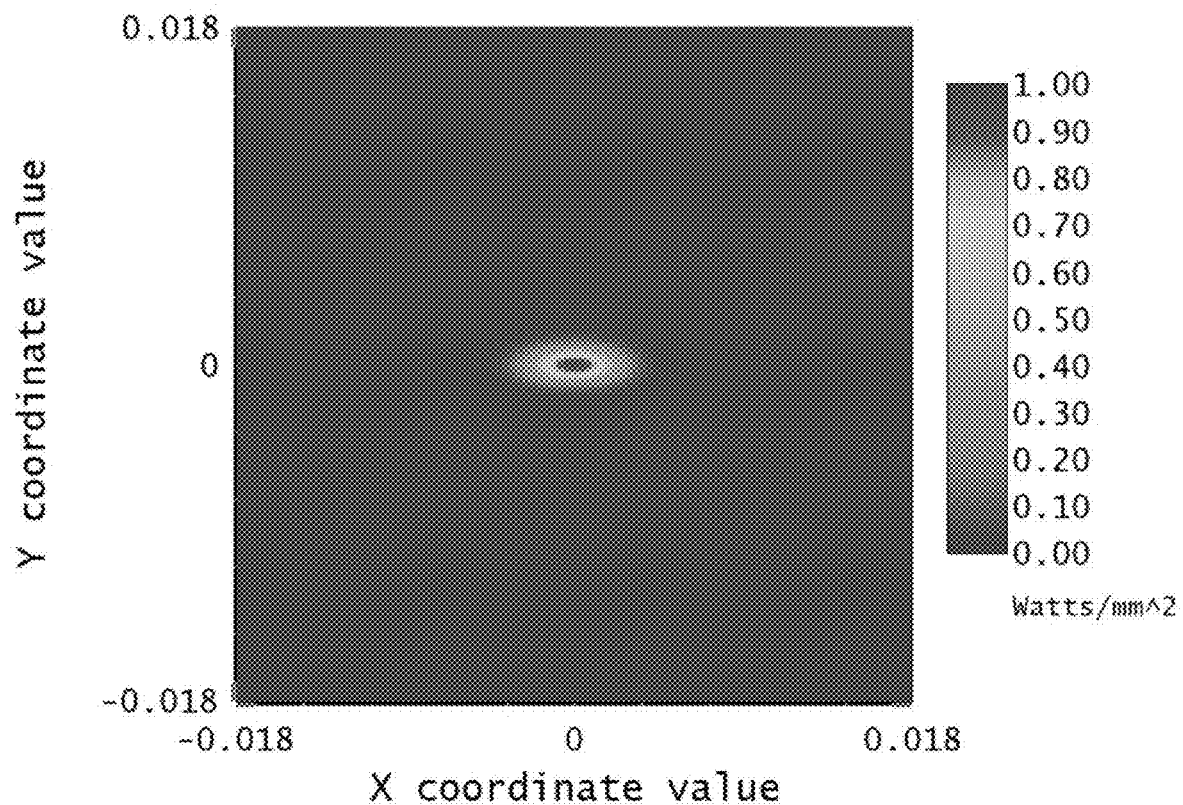
FIG. 9 illustrates the laser emitter optic characteristics including the power density irradiance distribution along the x and y orientation of a Gaussian beam with a wavelength of 0.905 $\mu m$.

FIGS. 8 and 9 illustrate laser emitter optic characteristics. FIG. 8 illustrates the laser emitter optic characteristics including the cross section phase in radians along the x and y orientation of a Gaussian beam with a wavelength of 0.905 μm. FIG. 9 illustrates the laser emitter optic characteristics including the power density irradiance distribution along the x and y orientation of a Gaussian beam with a wavelength of 0.905 μm.

In certain examples, the active laser emitter has a pulse rate of 100 nsec and a duty cycle of 0.1%. If the laser is used in sequential flash mode, the emission response rate would peak up to 10K Hz. The global shutter camera has response times over field of view typically over a range of 30-100 Hz. Therefore, the laser can fire at rates of 100 to 300 times faster than the camera field rate and thus illuminate the scene for many combinations of S/N (i.e. frames of active source light frames to passive frames) for the laser to fire at fractional rates of the camera so that the scene image can be compared. Examples of the relationships between the laser response, camera response, and number of frames needed to detect an object (e.g., a brick object) at 150 meters are shown in Table 1.

TABLE 1

| Laser Response | Camera Response | Laser Frames | Camera Integration (Active to Passive) | Integrated frames for brick object detection at 150 m |
|---|---|---|---|---|
| 9.9 K HZ | 30 Hz | 33 of 330 | 10% | 5 |
| 9.9 K HZ | 30 Hz | 100 of 330 | 30% | 5 |
| 9.9 K HZ | 30 Hz | 165 of 330 | 50% | 5 |
| 9.9 K HZ | 60 Hz | 33 of 165 | 20% | 3 |
| 9.9 K HZ | 60 Hz | 50 of 165 | 30% | 3 |
| 9.9 K HZ | 60 Hz | 83 of 165 | 50% | 3 |
| 10.0 K HZ | 100 Hz | 10 of 100 | 10% | 3 |
| 10.0 K HZ | 100 Hz | 25 of 100 | 25% | 2 |
| 10.0 K HZ | 100 Hz | 50 of 100 | 50% | 2 |

The flexibility of the active/passive frames gives many opportunities to use standard image processing to compare the active frames. The active frames do not have to be sequential as they could be staggered in many combinations to minimize object movement in field.

For example, a low rate of active to passive frame integration could be initiated and if a potential object is indicated (by comparison of the passive to active frame), a higher active to passive frame integration could be implemented to confirm object size. At a 100 Hz camera frame rate, if the host vehicle was moving at a 100 kph (or 62 mph) velocity, then 2 sequential camera frames would be needed for the equivalent host vehicle movement of a brick size object at 150 meters distance to be detected.

The ratio of a number of active frames to a number passive frames may be dynamically adjusted based on: movement parameters of the vehicle (e.g., speed, velocity) and/or characteristics of objects detected in a scene by one or more sensors (e.g., distance to object, size of object, type of object). For example, the number of active frames that are captured during a certain period of time may be set to a first value before an object is detected in a scene and increased to a second value when the object is detected in a scene. In another example, the number of active frames that are captured during a certain period of time may be set to a first value before the vehicle moving at a first speed and may be increased to a second value when the speed of the vehicle is increased. In another example, the number of active frames that are captured during a certain period of time may be set to a first value when the vehicle is being operated in a semi-autonomous mode and may be set to a second value greater than the first value when the vehicle is operating in a fully autonomous mode.

In this manner, a high resolution active laser object detection system can be considered with only the additional laser emitter cost over a traditional global shutter camera. In other examples, the high resolution active laser object detection system may be provided together with other sensors of an autonomous vehicle to provide additional information for fusion with other sensor data or for controlling specific operations of the vehicle.

Figure 10:
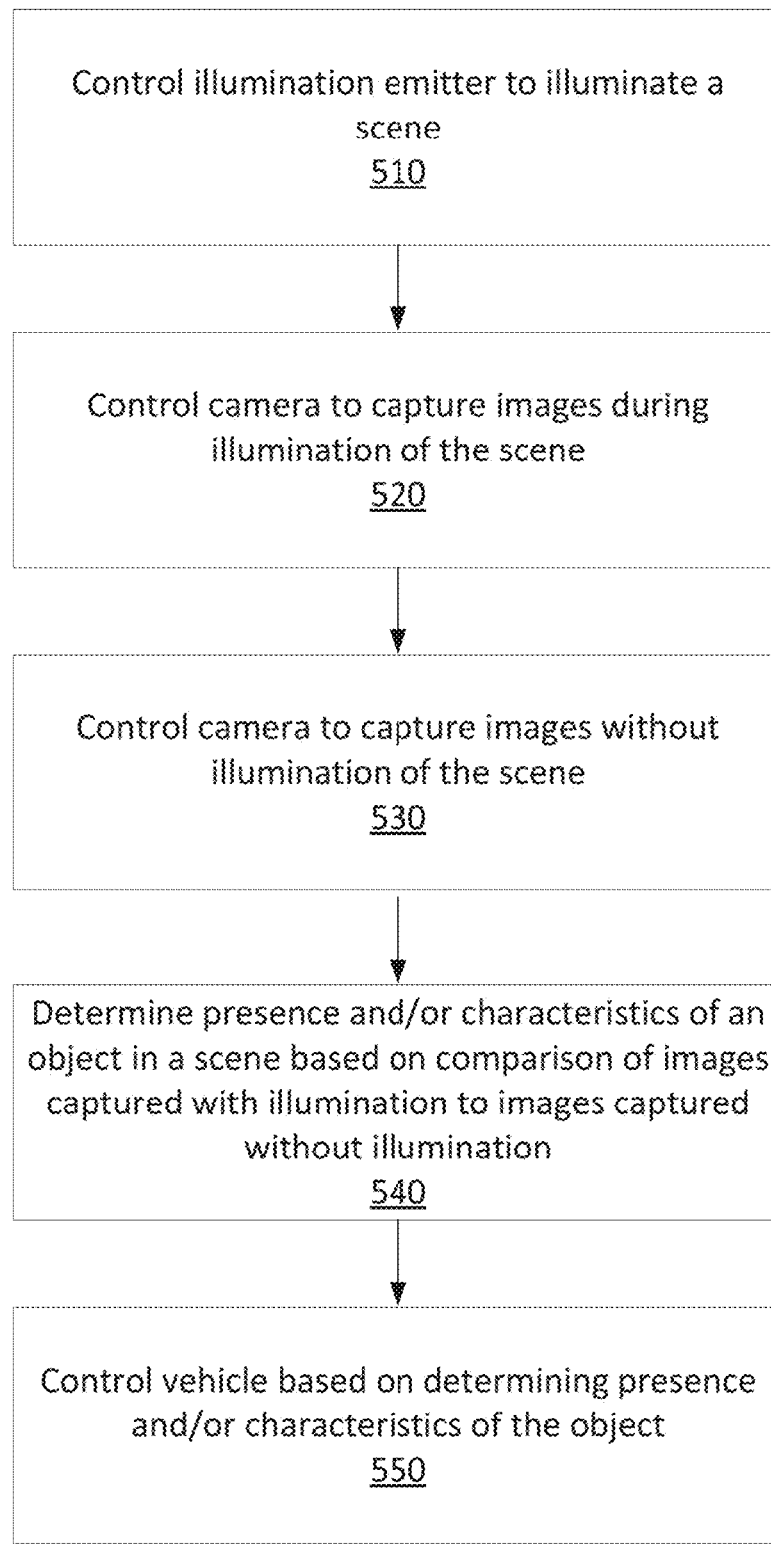
FIG. 10 shows a method for detecting presence of an object in a scene according to an embodiment of the present disclosure.

FIG. 10 shows a method for detecting presence of an object in a scene. In some examples, a processing system including one or more processors and memory may be configured to control an image processing system to perform one or more operations of the method shown in FIG. 10.

In operation 510, an illumination emitter is controlled to illuminate a scene. The illumination emitter may be controlled to illuminate the scene only during certain periods of time while a sequence of images is captured using a camera, which may be a global shutter camera. The illumination emitter may be controlled to provide illumination for a duration of an integration time of the global shutter camera.

In operation 520, the camera is controlled to capture images during illumination of the scene by the illumination emitter and the camera is controlled to captured images without illumination of the scene by the illumination emitter in operation 530. The number of images captured with illumination and without illumination may be selected based on characteristics of the illumination emitter and the camera (e.g., shown in Table 1), detection of an object in the scene, one or more characteristics of the object determined by one or more sensors of the system, and/or movement parameters of the vehicle (e.g., speed, velocity).

In operation 540, presence of and/or characteristics of an object in the scene are determined based on a comparison of the images captured with illumination to images captured without illumination. The comparison may include comparing illuminated light reflecting from the object to the background light from images without illumination. The background light serves as a continuous reference point. Pixels with reflected light (e.g., difference between pixels in active and passive images) exceeding a threshold may be determined as an object of interest in the vehicle path. The threshold may be set dynamically based on average pixel values in one or more images captured without illumination and/or one or more images captured with illumination.

In one example, operation 540 may include first determining presence of the object based on the comparison of a first set of images and, if the presence of the object is determined, determine one or more characteristics of the object in the scene based on comparison of additional images captured without illumination of the scene and additional images captured with illumination of the scene. The comparison may include comparing an image captured without illumination to a subsequent image captured with illumination, such that the time difference between the images being compared is minimized. In some examples, the comparison may include comparing a first image captured without illumination to (1) a second image captured without illumination immediately before the first image and (2) to a third image captured without illumination immediately after the first image.

The comparison may include comparing pixels corresponding to an object in the subsequent images. The pixels corresponding to the object may be detected by analyzing only images captured without illumination and/or by comparing images captured with illumination to images captured without illumination. For example, an object may be detected if the illuminated light reflected of the object, as compared to the object in the image not illuminated by the light source, exceeds a set threshold.

In one example, a plurality of objects within an image may be determined from images captured without illumination and each of the plurality of objects (e.g., pixels corresponding to the objects) is analyzed to determine whether the object is a potential threat by comparing the pixels corresponding to the object in the image captured without illumination to pixels corresponding to the object in the image captured with illumination. In this example, the initial analysis may determine objects including objects that are not a threat (e.g., objects painted on a wall or road) and objects that are a threat (e.g., a brick on the road), and each of the objects may be further analyzed by using images captured with illumination to determine whether they are a threat.

One or more characteristics of the object (e.g., size, shape, type) may also be determined based on the comparison of the images captured with illumination and without illumination. In some examples, the ratio of active to passive frames may be increased to improve accuracy of the determining the characteristics of the objects.

In operation 550, the vehicle may be controlled based on determining presence and/or characteristics of the object. The vehicle may also be controlled based on data received from other sensors (a LiDAR system, Global Positioning System). In some examples, images captured without illumination may be used to extract data for control the vehicle without using images captured with illumination. For example, a vehicle to be positioned within a traveling lane may be controlled based on analyzing images of the scene captured without illumination, while objects for collision avoidance may be detected using both images with and without illumination.

In some examples, the system may be configured to, based on determining that the object is a potential threat for the vehicle, determine whether the object is in a path of the vehicle, and based on determining that the object is in the path of the vehicle, control the vehicle to take defensive measured to avoid collision with the object. For example, the vehicle may be slowed down and/or moved to another lane.

While the examples of the present technology are described with reference to a vehicle, they are not so limited and may be applied to other camera systems installed in other locations. For example, examples of the present technology may be applicable to cameras installed in aerial vehicles (e.g., drones, planes, autonomous planes), robots, inside or outside of buildings, walls, and traffic lights.

Figure 11:
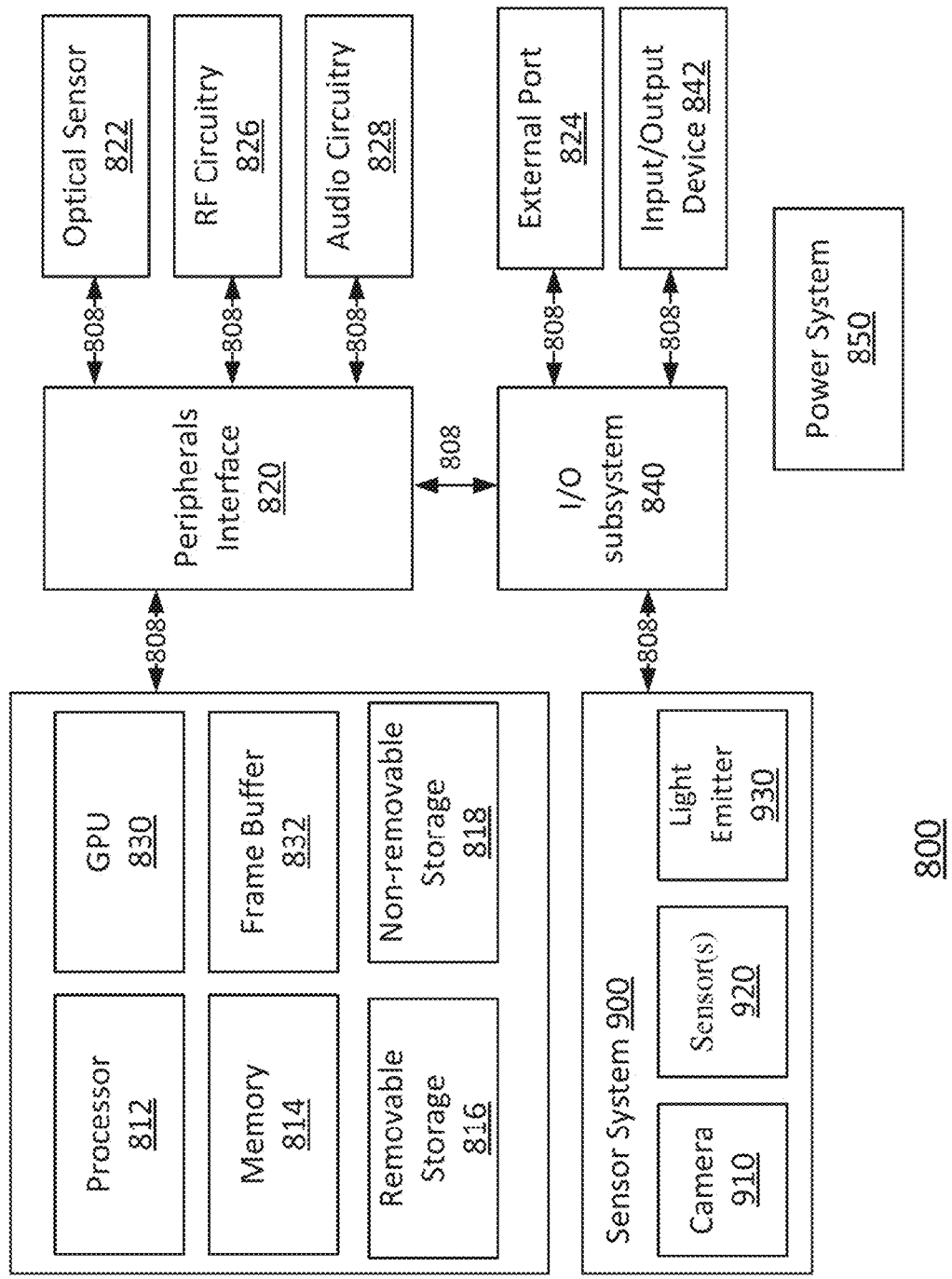
FIG. 11 illustrates an exemplary processing system upon which various embodiments of the present disclosure(s) may be implemented.

FIG. 11 illustrates an exemplary system 800 upon which embodiments of the present disclosure(s) may be implemented. For example, the system 800 may perform one or more of the operations described with reference to FIG. 10. The system 800 may be included in a vehicle, but is not so limited. The system 800 may be a portable electronic device that is commonly housed, but is not so limited. The system 800 may include a sensor system 900 comprising a camera 910, one or more other sensors 920 and a light emitter 930. In some examples, the light emitter 930 may correspond to the illumination emitter 170 shown in FIG. 1. The camera 910 may be a global shutter camera. The various components in the system 800 may be coupled to each other and/or to a processing system by one or more communication buses or signal lines 808.

The sensor system 900 may be coupled to a processing system including one or more processors 812 and memory 814. The processor 812 may comprise a central processing unit (CPU) or other type of processor. Depending on the configuration and/or type of computer system environment, the memory 814 may comprise volatile memory (e.g., RAM), non-volatile memory (e.g., ROM, flash memory, etc.), or some combination of the two. Additionally, memory 814 may be removable, non-removable, etc.

In other embodiments, the processing system may comprise additional storage (e.g., removable storage 816, non-removable storage 818, etc.). Removable storage 816 and/or non-removable storage 818 may comprise volatile memory, non-volatile memory, or any combination thereof. Additionally, removable storage 816 and/or non-removable storage 818 may comprise CD-ROM, digital versatile disks (DVD) or other optical storage, magnetic cassettes, magnetic tape, magnetic disk storage or other magnetic storage devices, or any other medium which can be used to store information for access by processing system.

As illustrated in FIG. 11, the processing system may communicate with other systems, components, or devices via peripherals interface 820. Peripherals interface 820 may communicate with an optical sensor 822, external port 824, RC circuitry 826, audio circuity 828 and/or other devices. The optical sensor 882 may be a CMOS or CCD image sensor. The RC circuitry 826 may be coupled to an antenna and allow communication with other devices, computers and/or servers using wireless and/or wired networks. The system 800 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), BLUETOOTH (BLUETOOTH is a registered trademark of Bluetooth Sig, Inc.), Wi-MAX, a protocol for email, instant messaging, and/or a short message service (SMS), or any other suitable communication protocol, including communication protocols not yet developed as of the filing date of this document. In an exemplary embodiment, the system 800 may be, at least in part, a mobile phone (e.g., a cellular telephone) or a tablet.

A graphics processor 830 may perform graphics/image processing operations on data stored in a frame buffer 832 or another memory of the processing system. Data stored in frame buffer 832 may be accessed, processed, and/or modified by components (e.g., graphics processor 830, processor 812, etc.) of the processing system and/or components of other systems/devices. Additionally, the data may be accessed (e.g., by graphics processor 830) and displayed on an output device coupled to the processing system. Accordingly, memory 814, removable storage 816, non-removable storage 818, frame buffer 832, or a combination thereof, may comprise instructions that when executed on a processor (e.g., 812, 830, etc.) implement a method of processing data (e.g., stored in frame buffer 832) for improved display quality on a display.

The memory 814 may include one or more applications. Examples of applications that may be stored in memory 814 include, navigation applications, telephone applications, email applications, text messaging or instant messaging applications, memo pad applications, address books or contact lists, calendars, picture taking and management applications, and music playing and management applications. The applications may include a web browser for rendering pages written in the Hypertext Markup Language (HTML), Wireless Markup Language (WML), or other languages suitable for composing webpages or other online content. The applications may include a program for browsing files stored in memory.

The memory 814 may include a contact point module (or a set of instructions), a closest link module (or a set of instructions), and a link information module (or a set of instructions). The contact point module may determine the centroid or some other reference point in a contact area formed by contact on the touch screen. The closest link module may determine a link that satisfies one or more predefined criteria with respect to a point in a contact area as determined by the contact point module. The link information module may retrieve and display information associated with selected content.

Each of the above identified modules and applications may correspond to a set of instructions for performing one or more functions described above. These modules (i.e., sets of instructions) need not be implemented as separate software programs, procedures or modules. The various modules and sub-modules may be rearranged and/or combined. Memory 814 may include additional modules and/or sub-modules, or fewer modules and/or sub-modules. Memory 814, therefore, may include a subset or a superset of the above identified modules and/or sub-modules. Various functions of the system may be implemented in hardware and/or in software, including in one or more signal processing and/or application specific integrated circuits.

Memory 814 may store an operating system, such as Darwin, RTXC, LINUX, UNIX, OS X, WINDOWS, or an embedded operating system such as VxWorks. The operating system may include procedures (or sets of instructions) for handling basic system services and for performing hardware dependent tasks. Memory 814 may also store communication procedures (or sets of instructions) in a communication module. The communication procedures may be used for communicating with one or more additional devices, one or more computers and/or one or more servers. The memory 814 may include a display module (or a set of instructions), a contact/motion module (or a set of instructions) to determine one or more points of contact and/or their movement, and a graphics module (or a set of instructions). The graphics module may support widgets, that is, modules or applications with embedded graphics. The widgets may be implemented using JavaScript, HTML, Adobe Flash, or other suitable computer program languages and technologies.

An I/O subsystem 840 may include an imaging sensor controller, a LC light Modulator controller and/or other input/output controller(s). The other input/output controller(s) may be coupled to other input/control devices 842, such as one or more buttons. In some alternative embodiments, input controller(s) may be coupled to any (or none) of the following: a keyboard, infrared port, USB port, and/or a pointer device such as a mouse. The one or more buttons (not shown) may include an up/down button for volume control of the speaker and/or the microphone. The one or more buttons (not shown) may include a push button. The user may be able to customize a functionality of one or more of the buttons. The touch screen may be used to implement virtual or soft buttons and/or one or more keyboards.

In some embodiments, the system 800 may include circuitry for supporting a location determining capability, such as that provided by the Global Positioning System (GPS). The system 800 may include a power system 850 for powering the various components. The power system 850 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The system 800 may also include one or more external ports 824 for connecting the system 800 to other devices.

Portions of the present invention may be comprised of computer-readable and computer-executable instructions that reside, for example, in a processing system and which may be used as a part of a general purpose computer network (not shown). It is appreciated that processing system is merely exemplary. As such, the embodiment in this application can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

Embodiments of the subject matter and the functional operations described herein can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory storage medium for execution by, or to control the operation of, data processing apparatus (i.e., one or more computer programs). The computer storage medium can be one or more of: a machine-readable storage device, a machine-readable storage substrate, a random or serial access memory device, and combinations thereof.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this application.

The invention claimed is:

1. An image processing system comprising:
a global shutter camera;
a pulsed laser illumination source; and
a processing system comprising at least one processor and memory, the processing system configured to control the image processing system to:
control the pulsed laser illumination source to illuminate a scene;
control the global shutter camera to capture a sequence of images of the scene, wherein the captured sequence of images includes images that are captured without illumination of the scene by the pulsed laser illumination source and images that are captured while the scene is illuminated by the pulsed laser illumination source; and
determine presence of an object in the scene based on comparison of the
images captured without illumination of the scene and images captured with illumination of the scene,
wherein, when capturing an image while the scene is illuminated by the pulsed laser illumination source, the pulsed laser illumination source is controlled to provide illumination during an integration time of each pixel row of the global shutter camera for the image and without providing the illumination during an entire frame period of the image, and
wherein the pulsed laser illumination source comprises a focused diode laser array including:
a flat surface and a spherical surface,
a collimation lens comprising two spherical surfaces, two horizontal divergence lenses comprising two spherical surfaces and two cylindrical surfaces, and two vertical divergence lenses comprising two spherical surfaces and two cylindrical surfaces.

2. The image processing system of claim 1, wherein the processing system is further configured to, in response to determining presence of the object in the scene, determine one or more characteristics of the object in the scene based on comparison of the images captured without illumination of the scene and the images captured with illumination of the scene.

3. The image processing system of claim 1, wherein comparison of the images captured without illumination of the scene and the images captured with illumination of the scene includes comparison of an image captured without illumination to a subsequent image captured with illumination.

4. The image processing system of claim 3, wherein comparison of the image captured without illumination to the subsequent image captured with illumination includes comparison of pixels at the same positions in the image captured without illumination and the subsequent image captured with illumination.

5. The image processing system of claim 1, wherein the processing system is further configured to:
in response to determining presence of the object in the scene, determine a difference between intensity of pixels corresponding to the object in the images captured with illumination and intensity of pixels corresponding to the object in the images captured without illumination; and
determine the object as a potential threat for a vehicle based on the difference being greater than a set value.

6. The image processing system of claim 5, wherein the processing system is further configured to:
based on determining that the object is a potential threat for the vehicle, determine whether the object is in a path of the vehicle; and
based on determining that the object is in the path of the vehicle, control the vehicle to take defensive measures to avoid collision with the object.

7. The image processing system of claim 6, wherein the processing system is further configured to control a vehicle to be positioned within a traveling lane based on analyzing images of the scene captured without illumination.

8. The image processing system of claim 1, wherein a field of view of the global shutter camera exceeds a beam pattern of the pulsed laser illumination source.

9. The image processing system of claim 1, wherein the pulsed laser illumination source is included in a light detection and ranging (LiDAR) system.

10. The image processing system of claim 1, further comprising a light detection and ranging (LiDAR) system, wherein the processing system is configured to detect objects within a path of a vehicle based on comparison of the images captured without illumination of the scene and images captured with illumination of the scene and based on data received from the LiDAR system.

11. The image processing system of claim 1, wherein the image processing system is included in a vehicle and a ratio of a number of images captured with illumination of the scene to a number of images captured without illumination of the scene is less than one half and the ratio is dynamically adjusted based on movement parameters of the vehicle and characteristics of the object in the scene detected by one or more other sensors included in the vehicle.

12. The image processing system of claim 1, wherein a ratio of a number of images captured with illumination of the scene to a number of images captured without illumination of the scene is less than one half and the ratio is dynamically adjusted based on characteristics of the object in the scene.

13. A computer implemented method comprising:
controlling a pulsed laser illumination source to illuminate a scene;
controlling a global shutter camera to capture a sequence of images of the scene, wherein the captured sequence of images includes images that are captured without illumination of the scene by the pulsed laser illumination source and images that are captured while the scene is illuminated by the pulsed laser illumination source; and
determining presence of an object in the scene based on comparison of the
images captured without illumination of the scene and images captured with illumination of the scene,
wherein, when capturing an image while the scene is illuminated by the pulsed laser illumination source, the pulsed laser illumination source is controlled to provide illumination during an integration time of each pixel row of the global
shutter camera for the image and without providing the illumination during an
entire frame period of the image, and
wherein the pulsed laser illumination source comprises a focused diode laser array including:
a flat surface and a spherical surface,
a collimation lens comprising two spherical surfaces,
two horizontal divergence lenses comprising two spherical surfaces and two cylindrical surfaces, and
two vertical divergence lenses comprising two spherical surfaces and two cylindrical surfaces.

14. The method of claim 13, further comprising, in response to determining presence of the object in the scene, determining one or more characteristics of the object in the scene based on comparison of the images captured without illumination of the scene and the images captured with illumination of the scene.

15. The method of claim 13, wherein comparison of the images captured without illumination of the scene and the images captured with illumination of the scene includes comparison of an image captured without illumination to a subsequent image captured with illumination.

16. The method of claim 15, wherein comparison of the image captured without illumination to the subsequent image captured with illumination includes comparison of pixels at the same positions in the image captured without illumination and the subsequent image captured with illumination.

17. The method of claim 13, further comprising:
in response to determining presence of the object in the scene, determining a difference between intensity of pixels corresponding to the object in the images captured with illumination and intensity of pixels corresponding to the object in the images captured without illumination; and
determining the object as a potential threat for a vehicle based on the difference being greater than a set value.

18. The method of claim 17, further comprising:
based on determining that the object is a potential threat for a vehicle, determining
whether the object is in a path of the vehicle; and
based on determining that the object is in the path of the vehicle, controlling the
vehicle to take defensive measures to avoid collision with the object.

19. A computer-readable non-transitory storage medium having stored therein a program to be executed by a computer of an image processing system, the program, when executed, causing the computer to control the image processing system to at least:
control a pulsed laser illumination source to illuminate a scene;
control a global shutter camera to capture a sequence of images of the scene, wherein the captured sequence of images includes images that are captured without illumination of the scene by the pulsed laser illumination source and images that are captured while the scene is illuminated by the pulsed laser illumination source; and
determine presence of an object in the scene based on comparison of the images captured without illumination of the scene and images captured with illumination of the scene,
wherein, when capturing an image while the scene is illuminated by the pulsed laser illumination source, the pulsed laser illumination source is controlled to provide illumination during an integration time of each pixel row of the global shutter camera for the image and without providing the illumination during an entire frame period of the image, and
wherein the pulsed laser illumination source comprises a focused diode laser array including:
a flat surface and a spherical surface,
a collimation lens comprising two spherical surfaces,
two horizontal divergence lenses comprising two spherical surfaces and two cylindrical surfaces, and
two vertical divergence lenses comprising two spherical surfaces and two cylindrical surfaces.

20. An image processing system comprising:
a global shutter camera;
a pulsed laser illumination source; and
a processing system comprising at least one processor and memory, the processing system configured to control the image processing system to:
control the pulsed laser illumination source to illuminate a scene;
control the global shutter camera to capture a sequence of images of the scene, wherein the captured sequence of images includes images that are captured without illumination of the scene by the pulsed laser illumination source and images that are captured while the scene is illuminated by the pulsed laser illumination source; and
determine presence of an object in the scene based on comparison of the
images captured without illumination of the scene and images captured with illumination of the scene,
wherein, when capturing an image while the scene is illuminated by the pulsed laser illumination source, the pulsed laser illumination source is controlled to provide illumination during an integration time of each pixel row of the global shutter camera for the image and without providing the illumination during an entire frame period of the image, and
wherein a ratio of a number of images captured with illumination of the scene to a number of images captured without illumination of the scene is less than one half and the ratio is dynamically adjusted based on characteristics of the object in the scene.

21. The image processing system of claim 20, wherein the image processing system is included in a vehicle.

22. A computer implemented method comprising:
controlling a pulsed laser illumination source to illuminate a scene;

controlling a global shutter camera to capture a sequence of images of the scene, wherein the captured sequence of images includes images that are captured without illumination of the scene by the pulsed laser illumination source and images that are captured while the scene is illuminated by the pulsed laser illumination source; and determining presence of an object in the scene based on comparison of the images captured without illumination of the scene and images captured with illumination of the scene, wherein, when capturing an image while the scene is illuminated by the pulsed laser illumination source, the pulsed laser illumination source is controlled to provide illumination during an integration time of each pixel row of the global shutter camera for the image and without providing the illumination during an entire frame period of the image, and wherein a ratio of a number of images captured with illumination of the scene to a number of images captured without illumination of the scene is less than one half and the ratio is dynamically adjusted based on characteristics of the object in the scene.

23. A computer-readable non-transitory storage medium having stored therein a program to be executed by a computer of an image processing system, the program, when executed, causing the computer to control the image processing system to at least:

control a pulsed laser illumination source to illuminate a scene;

control a global shutter camera to capture a sequence of images of the scene, wherein the captured sequence of images includes images that are captured without illumination of the scene by the pulsed laser illumination source and images that are captured while the scene is illuminated by the pulsed laser illumination source; and determine presence of an object in the scene based on comparison of the images captured without illumination of the scene and images captured with illumination of the scene, wherein, when capturing an image while the scene is illuminated by the pulsed laser illumination source, the pulsed laser illumination source is controlled to provide illumination during an integration time of each pixel row of the global shutter camera for the image and without providing the illumination during an entire frame period of the image, and wherein a ratio of a number of images captured with illumination of the scene to a number of images captured without illumination of the scene is less than one half and the ratio is dynamically adjusted based on characteristics of the object in the scene.

24. The computer-readable non-transitory storage medium of claim 23, wherein the computer-readable non-transitory storage medium is included in a vehicle.

* * * * *